UNITED STATES PATENT OFFICE 2,122,320

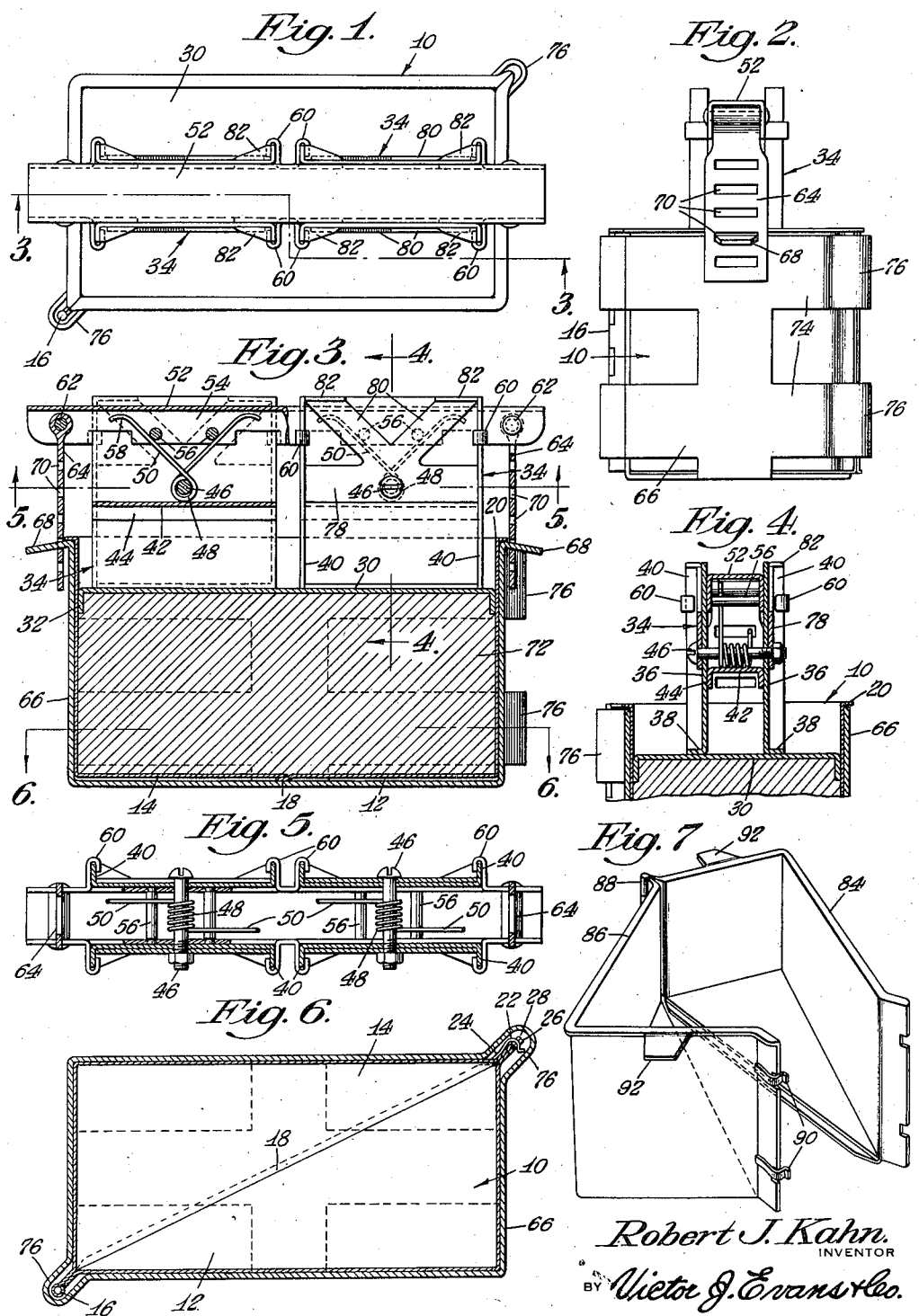

PRESSURE COOKER AND MOLD

Robert J. Kahn, Chicago, Ill.

Application October 2, 1934, Serial No. 746,574

2 Claims. (Cl. 53—22)

My invention relates to pressure cookers, and has among its objects and advantages the provision of an improved pressure and molding apparatus for foods in which the molding action takes place during the cooking of the food.

In the accompanying drawing:

Fig. 1 is a top plan view illustrating my invention;

Fig. 2 is an end view;

Fig. 3 is a sectional view along the line 3—3 of Fig. 1;

Fig. 4 is a sectional view along the line 4—4 of Fig. 3;

Fig. 5 is a sectional view along the line 5—5 of Fig. 3;

Fig. 6 is a sectional view along the line 6—6 of Fig. 3; and

Fig. 7 is a perspective view of a modified form of mold box.

In the embodiment selected to illustrate my invention, I make use of a box 10 comprising two parts 12 and 14 hingedly connected together at 16. The bottom sections of the parts 12 and 14 have diagonal overlapping relation at 18. I provide a reenforcing flange 20 around the upper edge of the box 10 and arrange the hinge 16 to project beyond its respective corner of the box. To detachably connect the parts 12 and 14 together, I provide a latch comprising one or more resilient hooks 22 welded at 24 to the part 14 and having an end extending through openings in flanges 26 and 28 formed integrally with the parts 12 and 14, respectively. The hooked end extends over the flange 26 slightly to yieldingly hold the two flanges in juxtaposed relation.

My box contains the food product to be cooked and comprises the mold for the product. The split box permits the cooked and molded product to be removed intact by merely separating the parts 12 and 14. Pressure is applied to the food product during the cooking period for molding purposes.

In Figs. 1 and 3, the pressure plate 30 is coextensive with the box 10 and is provided with flanges 32 fitting snugly within the walls of the box. Upon the pressure plate 30 I mount two standards 34, each comprising a pair of spaced plates 36, see Fig. 4. I weld the flanges 38 of the plates to the pressure plate 30, and bend each plate to provide two vertical flanges 40. Each pair of spaced plates 36 is provided with a floor 42 having flanges 44 for supporting the plates in spaced relation.

I pass a bolt 46 through each pair of spaced plates and mount a coil spring 48 upon each bolt. These springs have their ends 50 extending upwardly in angular relation and support a pressure beam 52 arranged between the two pair of plates and extending beyond the end of the device. I provide the flanges 54 of the beam with two pairs of cross pins 56 arranged in contact with the ends 50 for flexing the springs 48. I curve the spring ends 50 at 58 to prevent the ends from engaging the beam 52 in case of structural variations which might bring the ends into engagement with the beam. In this way, the spring ends 50 embody maximum length for co-operation with the pins 56.

I provide a plurality of guide hooks 60 upon the flanges 54, which hooks embrace the flanges 40 for guiding the pressure beam 52. Each end of the beam is provided with a cross bolt 62 upon which I pivotally mount a latch member 64. Referring to Figs. 2 and 3, the box 10 is positioned within an open basket 66, which basket fits the box snugly and is provided with two laterally projecting ears 68 shaped for reception within any one of the openings 70 in the latch members 64.

In operation, pressure is applied to the contents 72 by the pressure plate 30. The springs 48 determine the pressure upon the contents 72. After the contents 72 have been placed in the box 10, the pressure plate 30 is placed within the box and pressed down on the contents. At this time, the beam 52 is pressed downwardly between the plates 36 against the tension of the springs 48 and latched in its depressed position by connecting the latch member 64 with the ear 68. The amount the beam 52 is depressed will, of course, determine the spring pressure upon the contents.

My basket 66 provides protection for the box 10 and holds the parts 12 and 14 in assembled relation against any spreading action due to internal pressures.

The arrangement is such that an irregularly shaped mass placed within the box 10 and cooked therein, as by steam, submerging the entire device in boiling fluids, or otherwise heat treated, will be formed into a regularly shaped block of uniform thickness from end to end, and side to side.

Referring to Fig. 6, the horizontal bands 74 comprising a part of the basket 66 are shaped to provide loops 76 for receiving the hinge 16 and the flanges 26 and 28 and their associated fasteners. In this way, the hinge and fastening parts lie outside the box 10 and do not interfere with the shaping of the contents 72.

In Fig. 3, I mount a reenforcing structure 78 upon the outer side of each of the plates 36, which structure is provided with an opening to receive the bolt 46. This structure is provided with two diagonal reaches 80 having their ends bent to provide laterally projecting flanges 82 welded to the upper ends of the guide flanges 36.

In Fig. 7, I show a slightly different form of box structure in which the parts 84 and 86 are hingedly connected together at 88 in the same way as the box 10 and are provided with spring fastening clips 90 of the same type. The difference resides in the provision of an ear 92 upon each part 84 and 86 which performs the same function as the ear 68. In this form, I eliminate the basket 66.

Obviously, the box 10 may be shaped to meet specific requirements depending upon the nature of the foods to be treated therein.

Without further elaboration, the foregoing will so fully explain my invention that others may, by applying current knowledge, readily adapt the same for use under various conditions of service.

I claim:

1. A pressure cooker and mold comprising an inner container consisting of two sections, each section comprising an end wall, a side wall and a bottom part having a meeting edge extending from one end of the end wall to one end of the side wall, the meeting edges of the bottom parts being normally arranged in overlapping relation, a hinge for hingedly connecting the two sections, said hinge being positioned exteriorly of the inner container at substantially the meeting point between the end wall and the side wall of the other section, latch means for connecting the sections in latched relation, said latch means being located at one corner of the container diagonally opposite the hinge and being positioned exteriorly of the container, a pressure plate operating within the inner container, and means cooperable on the pressure plate and said outer container for urging the pressure plate inwardly of the inner container, said outer container cooperating with the inner container in such a manner as to resist separation of the sections incident to heavy pressures therein.

2. A pressure cooker and mold comprising an inner container consisting of two sections, each section comprising an end wall, a side wall and a bottom part having a meeting edge extending from one end of the end wall to one end of the side wall, the meeting edges of the bottom parts being normally arranged in overlapping relation, a hinge for hingedly connecting the two sections, said hinge being positioned exteriorly of the inner container at substantially the meeting point between the end wall and the side wall of the other section, latch means for connecting the sections in latched relation, said latch means being located at one corner of the container diagonally opposite the hinge and being positioned exteriorly of the container, an outer container closely embracing the inner container, a pressure plate operating within the inner container, and means cooperable on the pressure plate and said outer container for urging the pressure plate inwardly of the inner container, said outer container cooperating with the inner container in such a manner as to resist separation of the sections incident to heavy pressures therein, said outer container being so shaped as to embrace the hinge and said latch means.

ROBERT J. KAHN.